United States Patent
Hwang et al.

(10) Patent No.: US 11,129,156 B2
(45) Date of Patent: Sep. 21, 2021

(54) DOWNLINK CONTROL CHANNEL RECEPTION METHOD PERFORMED BY TERMINAL IN WIRELESS COMMUNICATION SYSTEM, AND TERMINAL USING SAME

(71) Applicant: LG ELECTRONICS INC., Seoul (KR)

(72) Inventors: Daesung Hwang, Seoul (KR); Yunjung Yi, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/619,395

(22) PCT Filed: Jun. 7, 2018

(86) PCT No.: PCT/KR2018/006453
§ 371 (c)(1),
(2) Date: Dec. 4, 2019

(87) PCT Pub. No.: WO2018/226033
PCT Pub. Date: Dec. 13, 2018

(65) Prior Publication Data
US 2020/0187171 A1  Jun. 11, 2020

Related U.S. Application Data

(60) Provisional application No. 62/517,130, filed on Jun. 8, 2017, provisional application No. 62/543,355, filed on Aug. 9, 2017.

(51) Int. Cl.
*H04W 72/04* (2009.01)
*H04L 1/18* (2006.01)
*H04L 5/00* (2006.01)
*H04W 64/00* (2009.01)

(52) U.S. Cl.
CPC ......... *H04W 72/042* (2013.01); *H04L 1/1861* (2013.01); *H04L 5/0053* (2013.01); *H04L 5/0094* (2013.01); *H04W 64/003* (2013.01)

(58) Field of Classification Search
CPC ......... H04L 1/1861; H04L 5/00; H04L 5/003; H04L 5/0053; H04L 5/0091;
(Continued)

(56) References Cited

U.S. PATENT DOCUMENTS

2018/0192383 A1* 7/2018 Nam ................. H04L 5/0044
2018/0227074 A1* 8/2018 Sun .................. H04L 1/001
(Continued)

OTHER PUBLICATIONS

HTC, "Configuration for search spaces and control resource sets", R1-1708538, 3GPP, TSG RAN WG1 Meeting #89, Hangzhou, China, May 15-19, 2017, see pp. 1-4.
(Continued)

*Primary Examiner* — Stephen J Clawson
(74) *Attorney, Agent, or Firm* — Dentons US LLP

(57) ABSTRACT

Provided are a physical downlink control channel (PDCCH) reception method performed by a terminal in a wireless communication system, and a terminal using same. The method comprises receiving, from a base station, allocation information for allocating a plurality of control resource sets (CORESETs), wherein the CORESETs are resources limited to some bands among system bands of the base station in a frequency region, and a single PDCCH is received via the plurality of CORESETs indicated by the allocation information.

9 Claims, 11 Drawing Sheets

(58) Field of Classification Search
CPC .. H04L 5/0094; H04W 64/003; H04W 72/04; H04W 72/042
See application file for complete search history.

(56) References Cited

U.S. PATENT DOCUMENTS

| | | | | |
|---|---|---|---|---|
| 2018/0227777 | A1* | 8/2018 | Sun | H04W 52/0212 |
| 2018/0287762 | A1* | 10/2018 | Sun | H04L 5/0053 |
| 2018/0288749 | A1* | 10/2018 | Sun | H04W 72/042 |
| 2018/0294911 | A1* | 10/2018 | Sun | H04L 5/0053 |
| 2018/0302186 | A1* | 10/2018 | Reddy | H04L 1/0072 |
| 2018/0302889 | A1* | 10/2018 | Guo | H04B 7/088 |
| 2019/0082427 | A1* | 3/2019 | Kim | H04W 72/042 |

OTHER PUBLICATIONS

Guangdong Oppo Mobile Telecom, "PDCCH Coreset configuration and UE Procedure on NR-PDCCH", R1-1707703, 3GPP TSG RAN WG1 Meeting #89, Hangzhou, China, May 15-19, 2017, see sections 1-2.

Mediatek Inc., "Design of Search Space and UE Blind Decoding", R1-1707822, 3GPP TSG RAN WG1 Meeting #89, Hangzhou, China, May 15-19, 2017, see section 2.

ETRI, "Discussion on configuration of search space and CORESET", RI-1708100, 3GPP TSG RAN WG1 Meeting #89, Hangzhou, China, May 15-19, 2017, see section 2.

Huawei et al.. "Search space design", R1-1706944, 3GPP TSG RAN WG1 Meeting #89, Hangzhou, China, May 15-19, 2017, see section 2.

* cited by examiner

DOWNLINK CONTROL CHANNEL RECEPTION METHOD PERFORMED BY TERMINAL IN WIRELESS COMMUNICATION SYSTEM, AND TERMINAL USING SAME

This application is the National Stage filing under 35 U.S.C. 371 of International Application No. PCT/KR2018/006453, filed on Jun. 7, 2018, which claims the benefit of U.S. Provisional Application Nos. 62/517,130 filed on Jun. 8, 2017, and 62/543,355 filed on Aug. 9, 2017, the contents of which are all hereby incorporated by reference herein in their entirety.

BACKGROUND OF THE DISCLOSURE

Field of the Disclosure

The present disclosure relates to wireless communications and more particularly to a downlink control channel reception method performed by a terminal in a wireless communication system and the terminal using the same.

Related Art

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

A communication system considering services or terminals vulnerable to reliability or latency has also been discussed, and a next-generation RAT considering improved mobile broadband communication, massive MTC, ultra-reliable and low latency communication (URLLC), and the like, may also be termed a new RAT or new radio (NR).

In NR, high reliability may be required according to an application field, and, at this point, an error rate required for downlink control information (DCI), for example, a block error rate (BLER), may be significantly lower compared to an existing technology.

The present disclosure provides a method and an apparatus for enhancing performance in detecting the DCI and for reducing an error rate.

SUMMARY OF THE DISCLOSURE

The present disclosure provides a downlink control channel reception method performed by a terminal in a wireless communication system and the terminal using the same.

Provided is a physical downlink control channel (PDCCH) reception method performed by a UE in a wireless communication system. The method includes receiving, from a base station, allocation information for allocating a plurality of control resource sets (CORESETs), wherein the plurality of CORESETs is resources limited to some bandwidth parts in a system bandwidth of the base station in a frequency domain and receiving a single PDCCH through the plurality of CORESETs indicated by the allocation information.

The plurality of CORESETs may be positioned in a plurality of carriers.

Each of the plurality of CORESETs may comprise a plurality of control channel elements (CCEs).

The plurality of CCEs in each of the plurality of CORESETs may be aggregated in a predetermined number.

A set of candidate values for the predetermined number in each of the plurality of CORESETs may be identical to each other.

A number of PDCCH candidates to which a PDCCH is allowed to be mapped may be identical for each specific aggregation level of CCEs in each of the plurality of control resource sets.

The single PDCCH may be received from the plurality of CORESETs through PDCCH candidates having an identical index.

Downlink control information (DCI) may be received through the single PDCCH.

The DCI may be encoded based on an amount of all resources in the plurality of CORESETs.

The DCI may be encoded based on resources of each of the plurality of CORESETs.

In another aspect, provided is a user equipment (UE). The UE includes a transceiver configured to transmit and receive a radio signal and a processor configured to operate in connection with the transceiver. The processor is further configured to receive, from a base station, allocation information for allocating a plurality of control resource sets (CORESETs), wherein the plurality of CORESETs is resources limited to some bandwidth parts in a system bandwidth of the base station in a frequency domain, and receive a single physical downlink control channel (PDCCH) through the plurality of CORESETs indicated by the allocation information.

In a next-generation wireless communication system such as NR, it is possible to transmit downlink control information (DCI) or a downlink control channel according to a reliability requirement even in an application field which requires high reliability.

DESCRIPTION OF EXEMPLARY EMBODIMENTS

Figure 1:
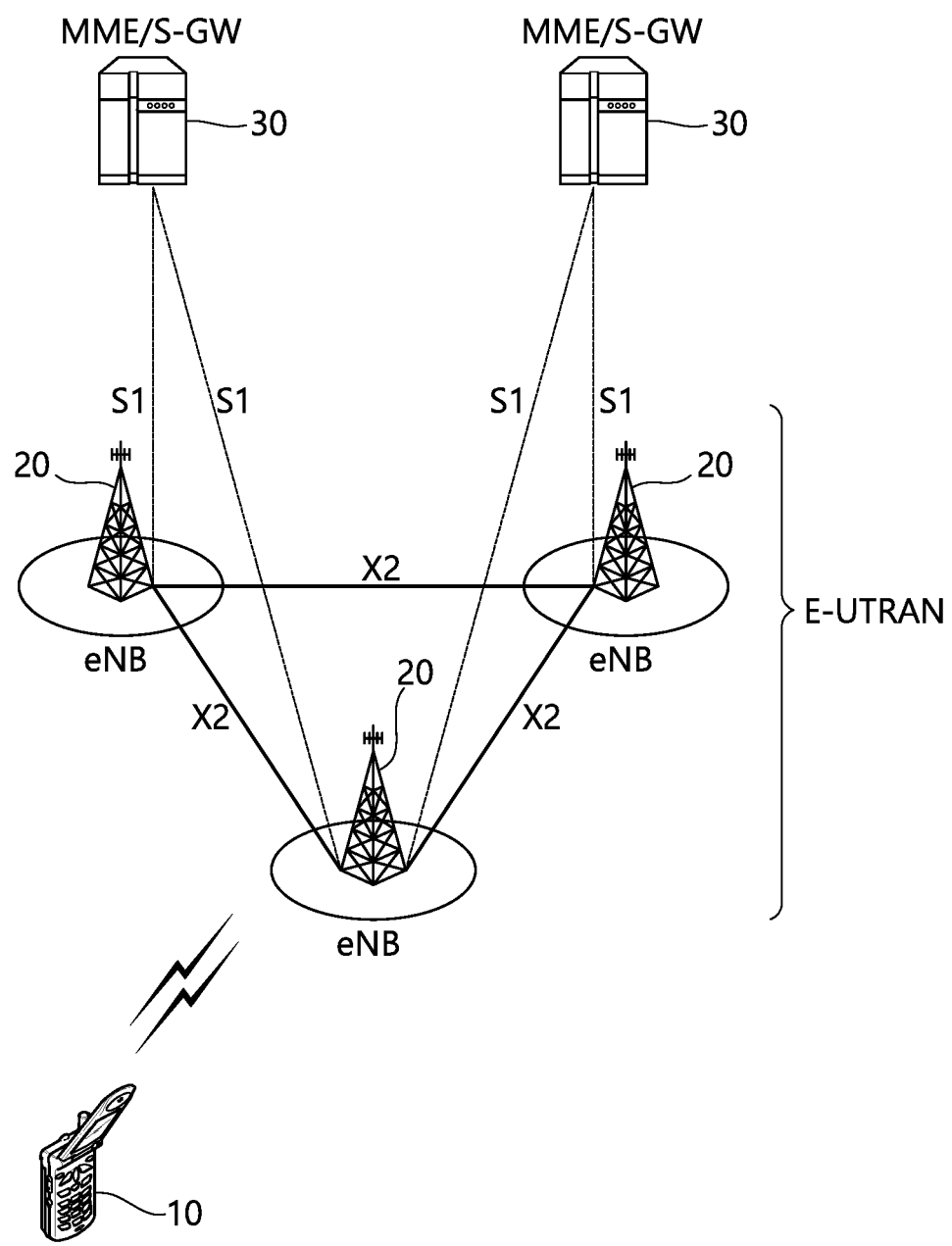
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
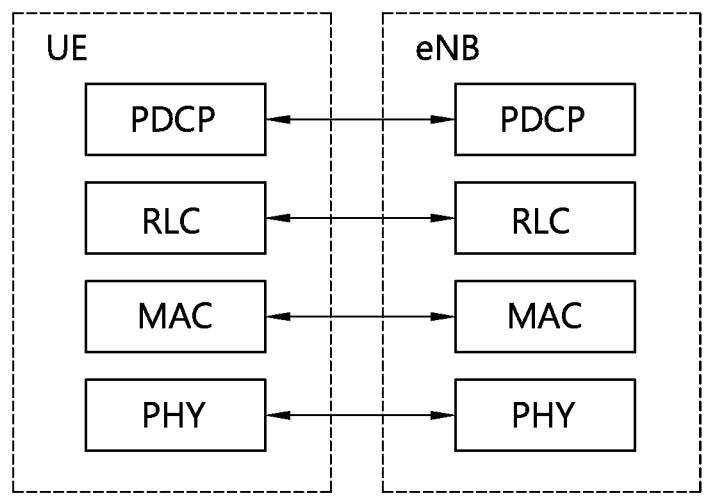
FIG. 2 is a diagram showing a radio protocol architecture for a user plane.
Figure 3:
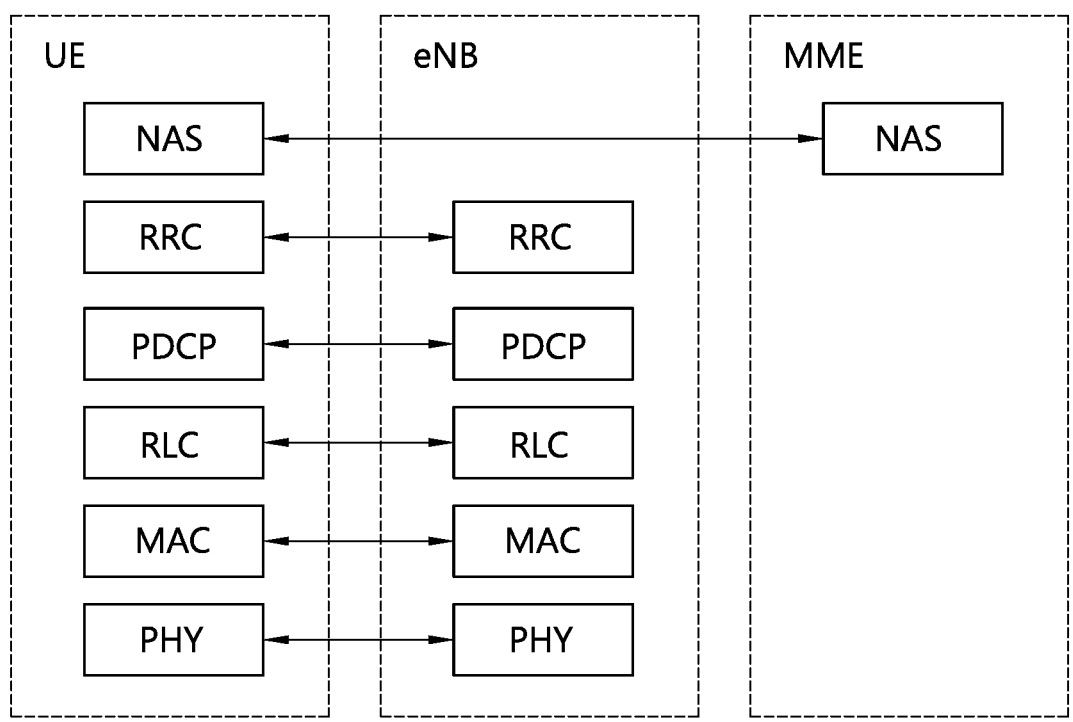
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 4:
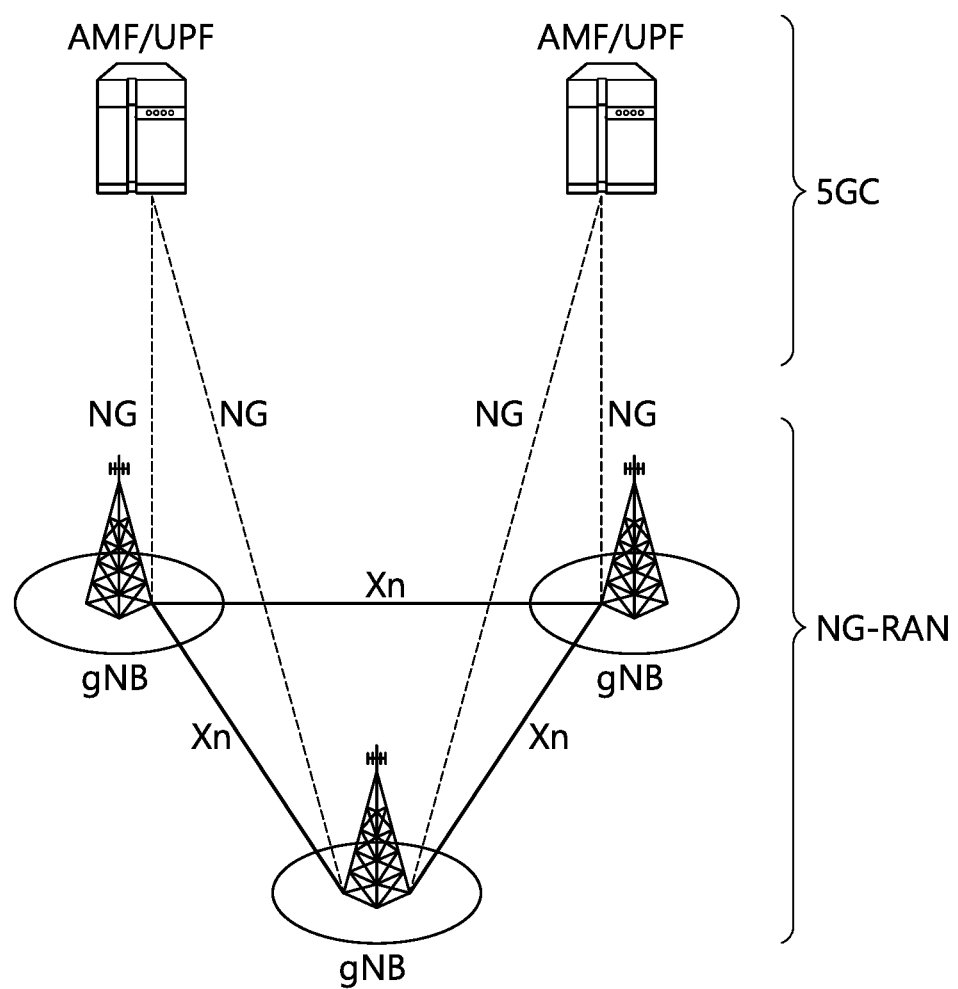
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 5:
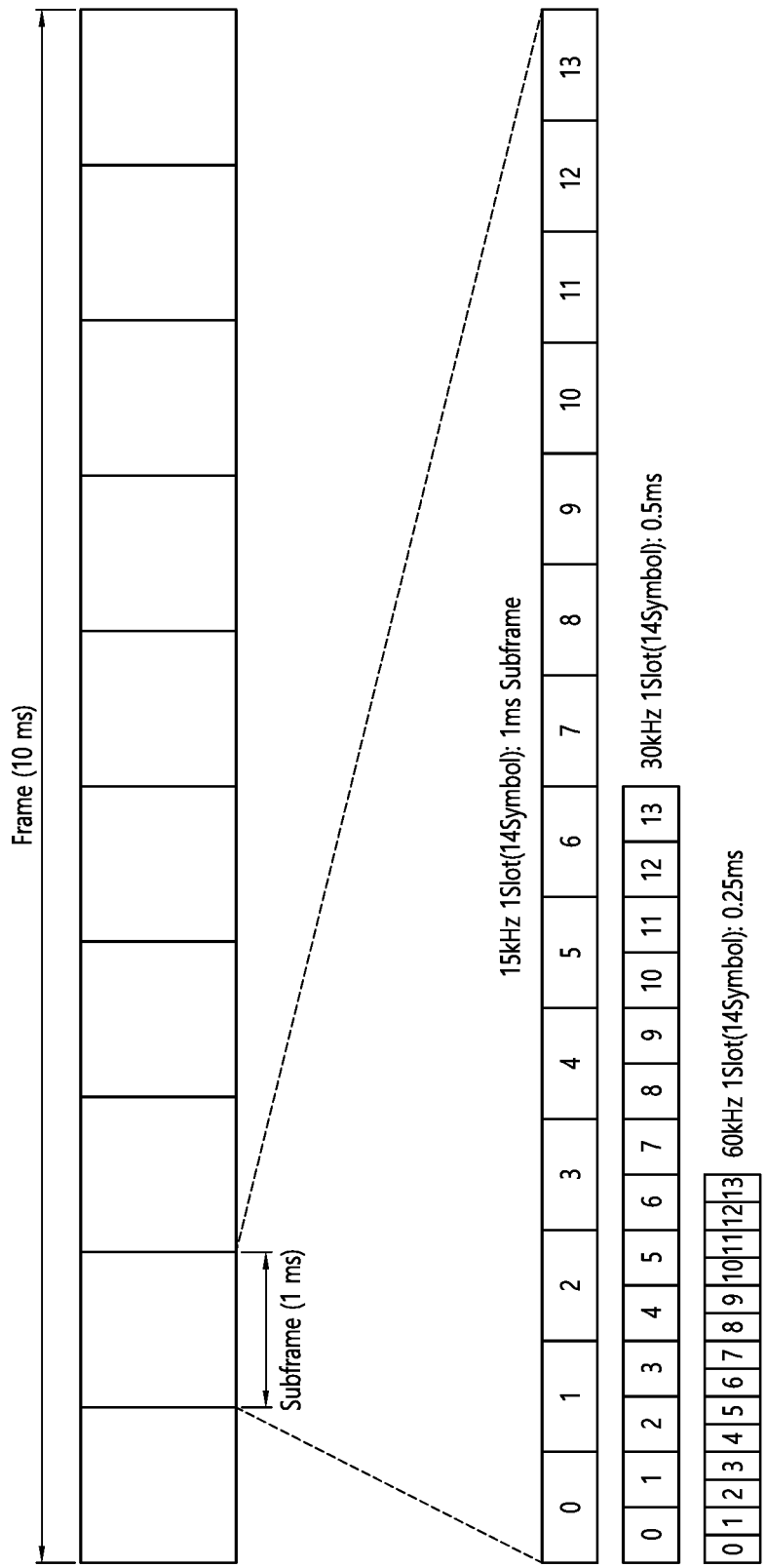
FIG. 5 illustrates a frame structure that may be applied in NR.

FIG. 5 illustrates a frame structure that may be applied in NR.

Referring to FIG. 5, a frame may be composed of 10 milliseconds (ms) and include 10 subframes each composed of 1 ms.

One or a plurality of slots may be included in a subframe according to subcarrier spacings.

The following table illustrates a subcarrier spacing configuration.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 5, μ=0, 1, 2 is illustrated.

A physical downlink control channel (PDCCH) may include one or more control channel elements (CCEs) as illustrated in the following table.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in NR, a new unit called a control resource set (CORESET) may be introduced. The terminal may receive the PDCCH in the CORESET.

Figure 6:
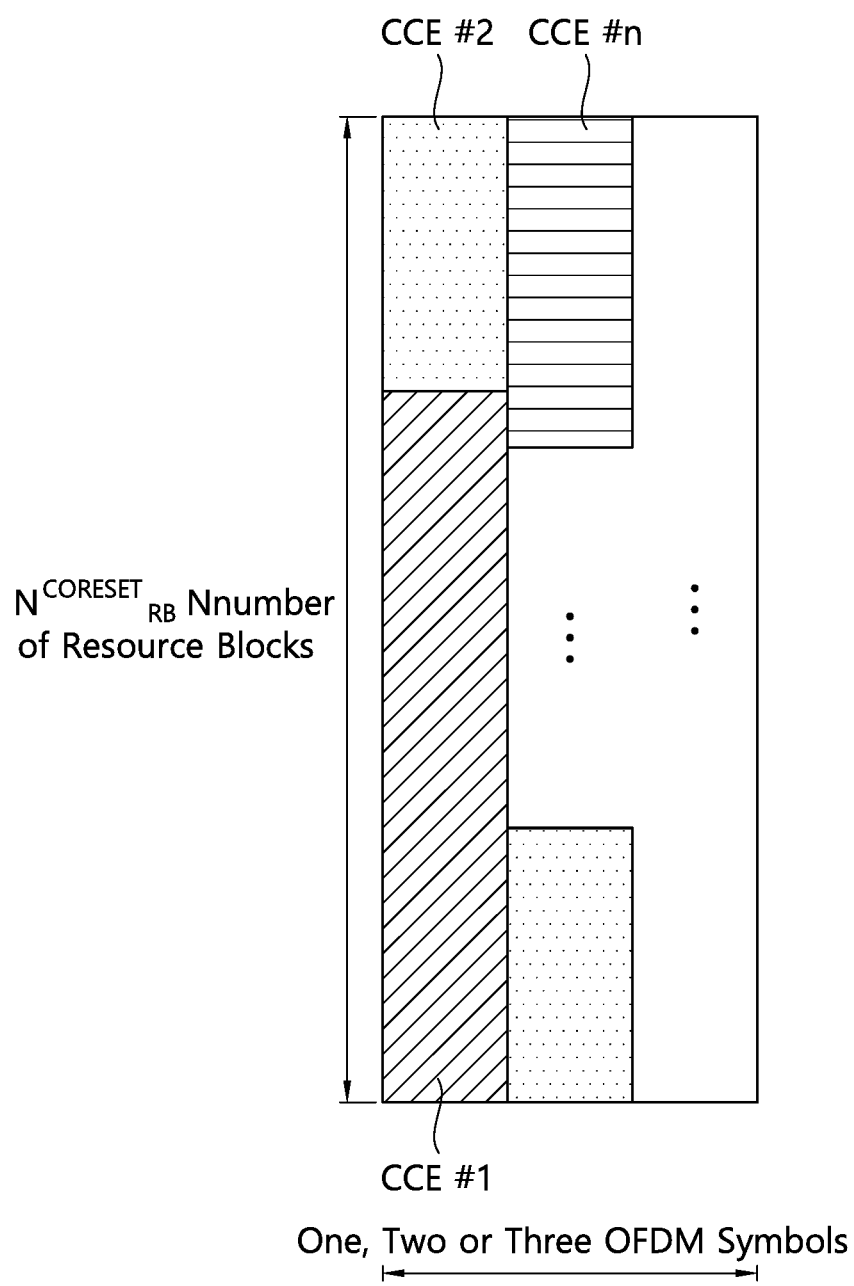
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
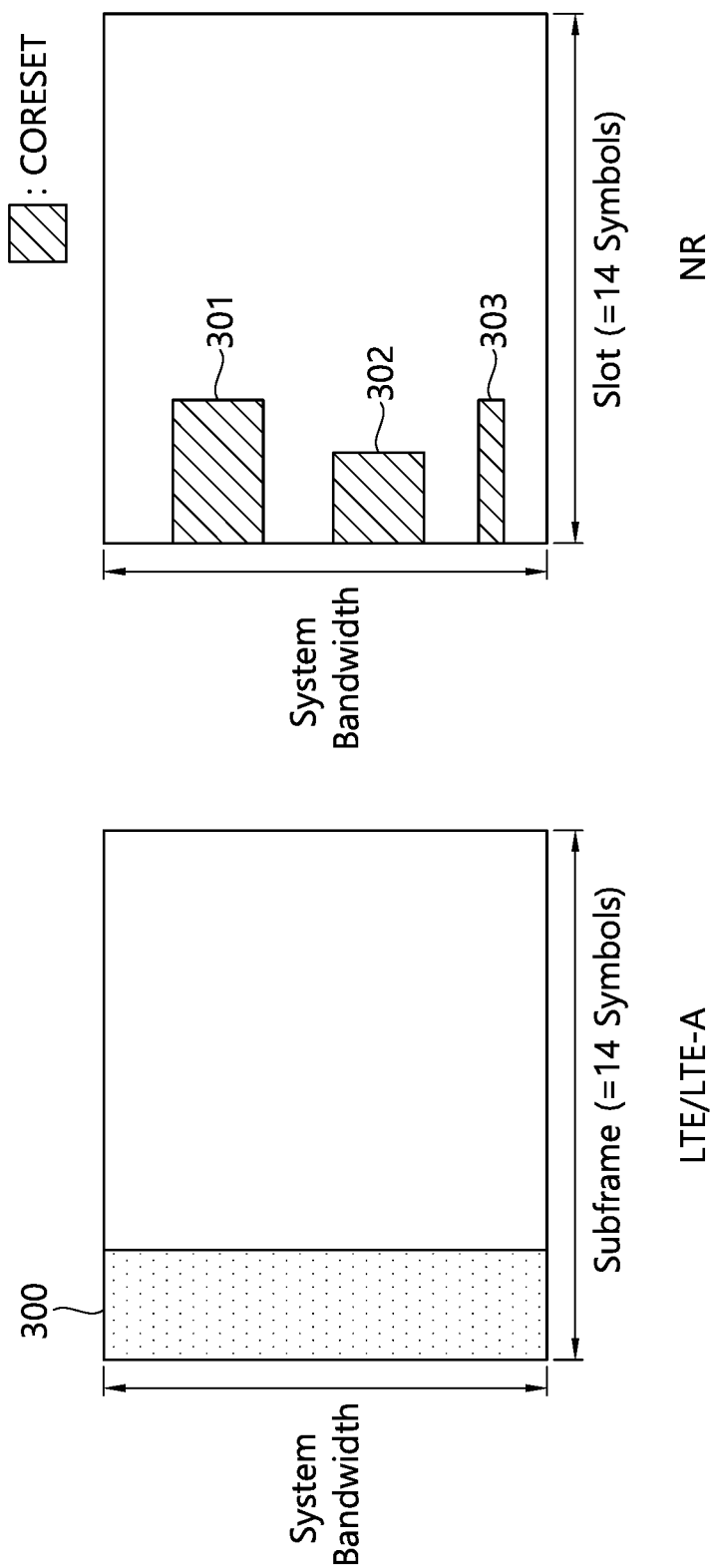
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, the NR introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, in NR, a high reliability may be required according to an application field, and, in this case, a target block error rate (BLER) for downlink control information (DCI) transmitted through a downlink control channel (e.g., a physical downlink control channel (PDCCH)) may be significantly low compared to an existing technology. As an example of a method for satisfying a high reliability requirement, an amount of contents included in the DCI may be reduced and/or an amount of resources used to transmit the DCI may be increased. In this case, the resources may include at least one of a resource in time domain, a resource in frequency domain, a resource in code domain, or a resource in spatial domain.

In the present disclosure, a resource mapping method regarding DCI transmission is proposed to enhance DCI detecting performance at a receiving stage and reduce an error rate.

In the following, for convenience of explanation, a resource mapping method regarding DCI or a PDCCH is described, but the present disclosure may be applied even to other channels (e.g., a PDSCH, a group-common PDCCH, a physical uplink shared channel (PUSCH), a physical uplink control channel (PUCCH), a sounding reference signal (SRS), and the like). In addition, the present disclosure may be applied, regardless of a radio access technology (RAT).

A PDCCH detection reliability may be secured by increasing an aggregation level that is used for PDCCH transmission. That is, if the number of control channel elements (CCEs) transmitting through a PDCCH (referred to as the aggregation level) is increased, a PDCCH detection reliability is increased as well.

In the assumption that one PDCCH transmission is performed in a single CORESET, if a time and/or frequency resource of the corresponding CORESET is set to support a higher aggregation level, the PDCCH detection reliability may be increased.

A CORESET for a specific PDCCH may be mapped to a plurality of carriers or a plurality of bandwidth parts, and/or may be mapped through a plurality of transmission layers, and/or may be mapped through a plurality of transmission and reception points (TRPs).

However, in a general situation (especially when a high reliability requiring application is transmitted not frequently but intermittently), setting an aggregation level of a CORESET excessively highly or reserving an increased amount of resources of the CORESET may be inefficient in terms of resource management.

Resources for a specific CORESET may be divided mainly into a primary resource and a supplementary resource, and whether the supplementary resource is used may differ depending on a slot.

Alternatively, configuration for a CORESET may change over time. In this case, whether the configuration for the CORESET changes or information on the change of the configuration for the CORESET may be indicated through a group-common PDCCH or through third DCI or through a channel. In doing so, a user equipment (UE) may assume PDCCH candidates and/or an aggregation level. Specifically, an aggregation level to be monitored may change according to mapping of the CORESET. For instance, an aggregation level in the case of mapping only to a primary resource may be different from an aggregation level in the case of mapping to a primary/supplementary resource.

As another example, a plurality of CORESETs may be configured and a specific single PDCCH may be mapped or transmitted through the plurality of CORESETs. Specifically, the plurality of CORESETs may be configured in the same carrier and/or the same bandwidth part, and/or the same TRP, and may be configured in different carriers, and/or different bandwidth parts and/or different TRPs.

According to the present disclosure, the single PDCCH may be transmitted using a plurality of PDCCH candidates or CCE sets located in different CORRESETs. In this case, a PDCCH candidate set or CCE set used for the PDCCH or a mapping method corresponding thereto may be configured in advance or may be indicated by a base station (e.g., signaling through a higher layer signal, or a group-common PDCCH, or third DCI).

In the following description, for convenience of explanation, it is assumed that a single PDCCH is transmitted through a plurality of CORESETs. However, the present disclosure may be also applied to transmitting of the single PDCCH through a single CORRESET. In this case, the plurality of CORESETs may correspond to a primary resource and supplementary resource in the single CORESET.

In addition, for convenience of explanation, it is assumed that a specific single PDCCH is mapped/transmitted to a first CCE set in a first CORESET and a second CCE set in a second CORESET. Alternatively, mapping/transmitting of a single CCE to a first REG set in the first CORESET and a second REG set in the second CORESET may be considered, and the present disclosure may be generally applied to such a case.

<Method for Configuring (or Constructing) a Plurality of CORESETs for a Single PDCCH>

Figure 8:
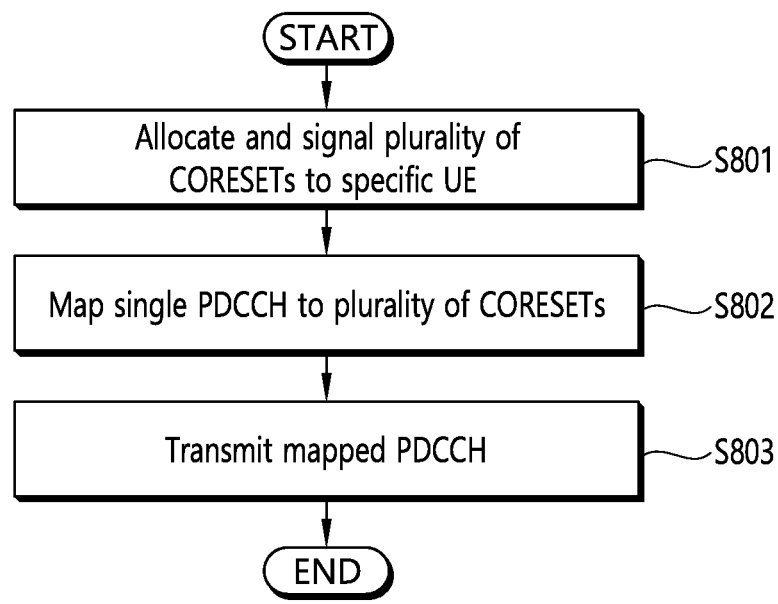
FIG. 8 illustrates an example of a downlink control channel (PDCCH) transmission method performed by a base station according to an embodiment of the present disclosure.

FIG. 8 illustrates an example of a downlink control channel (PDCCH) transmission method performed by a base station according to an embodiment of the present disclosure.

Referring to FIG. 8, the base station may allocate a plurality of CORESETs to a specific UE and may signal the allocation (S801). The base station may transmit a single PDCCH through the plurality of CORESETs, and configuration information regarding transmitting the single PDCCH mapped to the plurality of CORESETs is hereinafter referred to as CORRESET configuration information. The base station may signal the CORESET configuration information to the UE.

Then, the base station may map the single PDCCH to the plurality of CORESETs (S802), and transmit the mapped PDCCH (S803). That is, after mapping one PDCCH for a single UE to the plurality of CORESETs, it is possible to transmit the mapped PDCCH to the UE. The plurality of CORESETs may be, for example, configured in different carriers or bandwidth parts, and therefore, it is possible to increase reliability of reception of the PDCCH, compared to the case of transmitting the PDCCH through one CORESET. The plurality of CORESETs may be CORESETs indicated or allocated by the CORESET configuration information.

Figure 9:
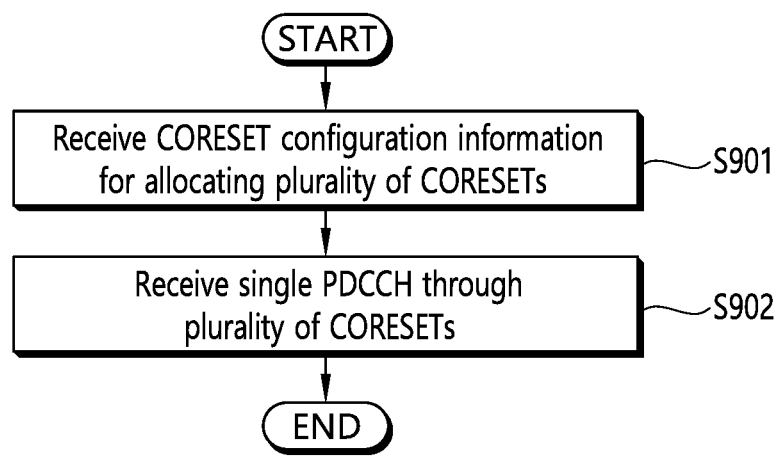
FIG. 9 illustrates an example of a downlink control channel (PDCCH) reception method performed by a UE in response to FIG. 8.

FIG. 9 illustrates an example of a downlink control channel (PDCCH) reception method performed by a UE in response to FIG. 8.

Referring to FIG. 9, the UE receives CORESET configuration information for allocating a plurality of CORESETs (S901), and receives a single PDCCH through the plurality of CORESETs (S902). As described above, a CORESET indicates a resource limited only to a part of a system bandwidth of the base station in frequency domain, the resource which is a control resource capable of receiving a PDCCH.

Hereinafter, each operation of FIGS. 8 and 9 will be described in more detail.

A plurality of CORESETs for a single PDCCH may be equally or differently configured in terms of a transmission and reception point (TRP), a transmission layer, a carrier, and/or a bandwidth part. Such configuration may be indicated by a base station.

At least for a UE supporting high reliability or having a corresponding mode configured thereto, at least one of the following information may be additionally indicated through CORESET configuration information when the base station configures a CORESET.

1) Information regarding a TRP: This may include, for example, v-shift (frequency offset) value regarding a wideband reference signal (RS) and/or a reference signal mapping method regarding a PDCCH (e.g., a sequence ID or scrambling initial value, and/or a mapping location).

2) Information regarding a carrier or a bandwidth part: This may include, for example, a serving cell index or a bandwidth part index.

3) Information regarding a transmission layer set or a port set: This may include information regarding a resource to which a reference signal regarding a PDCCH is mapped in each layer or port, and/or a reference signal sequence generating method.

Information for setting transmitting of a single PDCCH mapped to a plurality of CORESETs, that is, CORRESET configuration information, may be in the form in which multiple values are included in single CORESET configuration or may be in the form in which CORESET configuration including (the entire or some of) the above information is (virtually) provided in a plural number to support mapping/transmission of a specific PDCCH. When CORESET configuration is implemented, the CORESET configuration information may include information regarding a plurality of layers or ports, and, in this case, it is interpreted that MIMO operation is performed to transmit a PDCCH.

In another example, when a specific UE receives a PDCCH from a plurality of TRPs, information regarding the plurality of TRPs and/or information regarding a plurality of ports may be included in single CORRESET configuration, and, in this case, it may be interpreted that spatial multiplexing is performed on the same time-frequency resource.

On the other hand, a plurality of CORESET configurations may respectively contain TRP information and/or port information. When the plurality of CORESET configurations is indicated to a specific UE, signals transmitted from the plurality of TRPs may correspond to different time-frequency resources.

In another example, when a specific UE receives a PDCCH through a plurality of carriers or a plurality of bandwidth parts, this may be interpreted that a plurality of CORESETs having time-frequency resources independent of each other is configured.

For a specific PDCCH, it may be required to associate or combine (which is expressed as "bundle") different CCE sets belonging to the plurality of CORESETs. In consideration of blinding decoding performed at a UE, it may be preferable that the different CCE sets belonging to the plurality of CORESETs are mapped in the one-to-one form, if possible. In a more specific example, the number of PDCCH candidates in an aggregation level set or in a CORESET (at least for one specific aggregation level) may be set equally for a plurality of CORESETs for transmitting/mapping of a specific PDCCH.

In the above situation, PDCCH candidate #n in the first CORESET (for a specific aggregation level L) may be bundled with PDCCH candidate #n in the second CORESET (for the specific aggregation level L). Here, the meaning of "bundling" may be that, in the case of mapping a specific PDCCH through the plurality of CORESETs, the PDCCH candidate #n in the second CORESET is used at the same time when the PDCCH candidate #n in the first CORESET is used.

Figure 10:
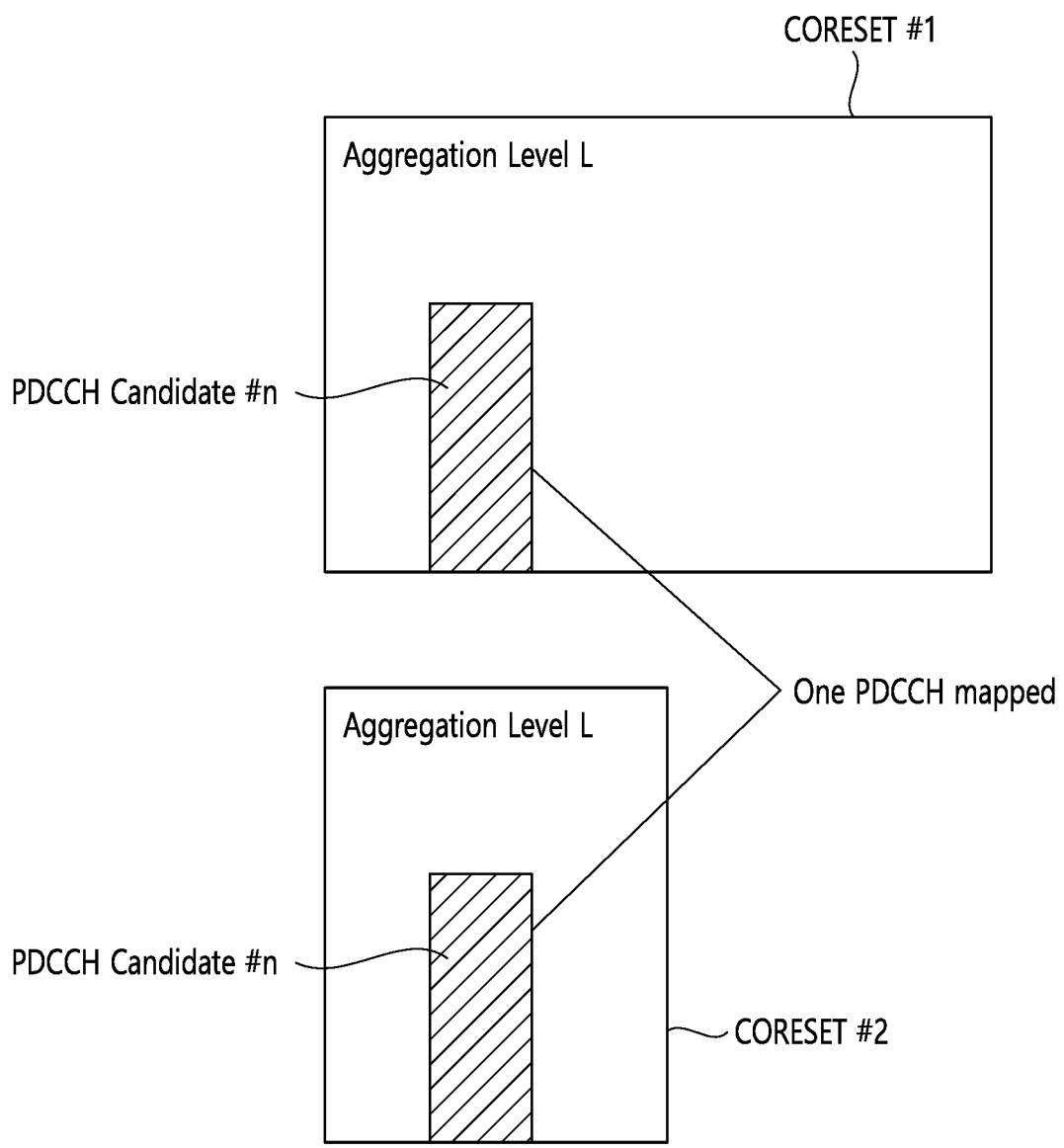
FIG. 10 illustrates an example of bundling (association or combination) of PDCCH candidates of respective CORESETs in the case of transmitting a single PDCCH through two CORESETs.

FIG. 10 illustrates an example of bundling (association or combination) of PDCCH candidates of respective CORESETs in the case of transmitting a single PDCCH through two CORESETs.

Referring to FIG. 10, a single PDCCH for a specific UE may be transmitted while mapped to a plurality of CORESETs, such as CORESET #1 and CORESET #2. When an aggregation level of CCEs is L in CORESET #1 and CORESET #2, the number of PDCCH candidates may be equally set and the PDCCH candidates may be indexed by the same criterion (e.g., indexing in ascending order from a PDCCH candidate having the smallest OFDM symbol index and located in the lowest frequency bandwidth). In this case, if the single PDCCH is mapped to PDCCH candidate #n and transmitted in CORESET #1, the PDCCH may be mapped to the PDCCH candidate #n and transmitted even in CORESET #2.

As another method, bundling PDCCH candidates in a plurality of CORESETs in a multi-to-multi form may be considered. However, this method has a problem that UE complexity increases.

In another example, the number of PDCCH candidates in an aggregation level set or a CORESET (for a specific aggregation level) may differ with respect to a plurality of CORESETs for transmitting/mapping of a specific PDCCH. In the above method, only some PDCCH candidates may be bundled.

In a more specific example, PDCCH candidates for a specific aggregation level may be bundled in ascending (or descending) order of indexes of the PDCCH candidates from the lowest value (or from the greatest value). More specifically, the specific aggregation level may be the greatest aggregation level in each CORESET or may be the minimum value among a plurality of CORESETs for the greatest aggregation level of each CORESET, or may be indicated by the base station to the UE (e.g., through at least one of a higher layer signal, a group-common PDCCH, or third DCI).

In the foregoing description, a process of bundling PDCCH candidates in a plurality of CORESETs has been described. However, in addition to using a preset rule, the base station may indicate information regarding bundling of the plurality of CORESETs to the UE (e.g., through at least one of a higher layer signal, a group-common PDCCH, or third DCI).

When monitoring a specific PDCCH, the UE may, upon receiving a plurality of CORESETs, perform blind decoding or a corresponding process using a CCE set corresponding to the specific PDCCH in each CORESET based on information regarding bundling of PDCCH candidates in the plurality of CORESETs.

In the above example, when it comes to using the plurality of CORESETs in order to transmit/map the specific PDCCH, a process of bundling PDCCH candidates in each CORESET is described but the bundling may be performed on the basis of a different unit (e.g., a CCE group in each CORESET, a CCE group or RRG or REG group or REG bundle, or an REG bundling group, or the like).

As an advantage of the above method, even when an aggregation level of a small value (e.g., 1) is configured using a plurality of CORESETs, it is possible to obtain a diversity gain in a similar level. However, blocking in the CORESETs may be likely to be optimized on a unit basis of a PDCCH candidate, and thus, a process for bundling by a unit smaller than a PDCCH candidate may be likely block another PDCCH candidate in the same CORESET. Accordingly, in the case of performing a process of bundling by a unit other than a PDCCH candidate, it is necessary to consider a blocking probability.

Meanwhile, a super CORESET composed of a plurality of CORESETs may be considered. CCEs forming the super CORESET may be formed of an REG or REG group or REG bundle belonging to the plurality of CORESETs. More specifically, in consideration of blocking, a specific N number of CCEs in the super CORESET may be generated from a specific N number of CCEs from the plurality of CORESETs. That is, resources regarding the specific N number of CCEs in the CORESET and corresponding resources regarding the specific N number of CCEs in the plurality of CORESETs may be identical.

As a specific example, CCE #a and CCE #b of a super COPRESET may be generated using CCE #1 of the first CORESET and CCE #2 of the second CORESET. A specific REG group forming CCE #1 of the first CORESET belongs to CCE #a, and other REG groups may belong to CCE #b. Similarly, a specific REG group forming CCE #2 may belong to CCE #a, and other REG groups may belong to CCE #b. As an advantage of the above example, blocking between CCE #1 and CCE #2 may occur when only CCE #a is used, but, when CCE #a and CCE #b are used, CCE #1 and CCE #2 are used and therefore it is possible to minimize influence of a specific REG or CCE. on the plurality of CCEs.

It is assumed that, when CORESETs configured for a UE are CORESET 1 and CORESET 2, there are aggregation level set 1 and aggregation level set 2 for monitoring the respective CORESETs. In this case, aggregation level set 3 for the entire CORESETs including CORESET 1 and CORESET 2 may be configured as below.

When aggregation level set $1=\{k1, k1*2, k1*4, \ldots\}$ and aggregation level set $2=\{k2, k2*2, k2*4, \ldots\}$ are assumed, aggregation level set $3=\{k1+k2, k1*2+k2*2, k1*4+k2*4, \ldots\}$ may be configured. That is, aggregation level set 3 may be configured by adding up the respective entries of aggregation level set 1 and aggregation level set 2.

The number of candidates for each aggregation level may be assumed to be the minimum value of candidates for two numbers.

In another example, when aggregation level set $1=\{k1, k1*2, k1*4, \ldots\}$ and aggregation level set $2=\{k2, k2*2, k2*4, \ldots\}$ are assumed, aggregation level set $3=\{k1+k2, k1+k2*2, k1+k2*4, \ldots, 2*k1+k2*2, \ldots\}$ may be configured. Even in this case, candidates for the respective aggregation levels are added up. The number of candidates for the respective aggregation levels may be assumed to be the minimum value of candidates for two numbers.

In yet another example, when aggregation level set $1=\{k1, k1*2, k1*4, \ldots\}$ and aggregation level set $2=\{k2, k2*2, k2*4, \ldots\}$ are assumed, aggregation level set $3=\{k2, k2*2, k2*4, \ldots\}$ may be configured. Candidates for an aggregation set may be configured by a higher layer. Candidates for a new aggregation level may be configured by adding CCEs for the corresponding candidates. It is assumed that the number of candidates for the respective aggregation levels is the minimum value of candidates for two numbers.

It may be assumed that blind decoding is performed on each of the corresponding aggregation level sets 1, 2, and 3, or that blind decoding is not performed on an aggregation level set for each CORESET while blind decoding is performed only on aggregation level set 3.

<Method for Mapping Coded Bits/Symbols Regarding a Single PDCCH to a Plurality of CORESETs>

If an aggregation level corresponding to a first CCE set is L1 and an aggregation level corresponding to a second CCE set is L2, a specific PDCCH to be transmitted through the two CORESETs may have an aggregation level of L1+L2.

In the above case, the number of resources to which a single PDCCH is allowed to be mapped may be increased. Following is a specific example of a method for mapping the specific PDCCH to the plurality of CORESETs.

First Example

DCI may be encoded based on an amount of all resources to which the PDCCH is to be mapped. In this example, encoding may be performed in the assumption that an aggregation level is L1+L2. A coded bit or symbol regarding DCI may be predetermined in advance or may be mapped to a specific CCE set through the plurality of CORESETs in a sequence or a mapping method, which is indicated by a base station (e.g., through a higher layer signal or a third PDCCH).

More specifically, a coded symbol regarding DCI may be mapped to the second CCE set after mapping to the first CCE set. More specifically, interleaving may be performed before mapping to a plurality of CCE sets.

For instance, even-numbered indexes (mapping to the second CCE set after first CCE set) and then odd-numbered indexes (mapping to the second CCE set after the first CCE set) may be mapped. In this method, the UE may decode a specific PDCCH after receiving a plurality of CCE sets belonging to a plurality of CORESETs. That is, channel estimation and decoding may be performed using coded symbols received from the plurality of CORESETs.

If a specific UE attempts to detect a PDCCH from each CORESET, a result of channel estimation may be shared or reused. Specifically, even though a PDCCH is transmitted through the plurality of CORESETs, a cyclic redundancy check (CRC) may be performed once with respect to the entire DCI. That is, for the UE having the plurality of CORESETs, the number of times to perform blind decoding to detect a PDCCH may increase. More specifically, a total number of PDCCH candidates in the first CORESET, a total number of PDCCH candidate in the second CORESET, and a total number of PDCCH candidates in the first CORESET and the second CORESET may be represented as the number of times to attempt to perform blind decoding. In this case, the number of times to attempt to perform blind decoding may be reduced in the following manner.

In the case where a method for transmitting a PDCCH through the plurality of CORESETs is set, the number of PDCCH candidates in the plurality of CORESETs may be changed (e.g., reduction), the PDCCH candidates which are targets to be detected. The number of PDCCH candidates in the plurality of CORESETs may be evenly reduced or may be reduced in consideration of a weight assigned to a specific CORESET. More specifically, a PDCCH in the corresponding specific CORESET may not be monitored.

Second Example

DCI may be encoded based on an amount of resources corresponding to a PDCCH in a CORESET to which the PDCCH is to be mapped. For instance, if the PDCCH is transmitted through two CORESETs, the same DCI may be encoded in accordance with each CORESET. That is, the DCI may be repeatedly transmitted to the plurality of CORESETs. When attempting to detect a specific PDCCH, the UE may attempt to detect a PDCCH at each CORESET. When failing to detect at least the specific PDCCH, the UE may store a soft value (e.g., a log-likelihood ratio) obtained after decoding the corresponding PDCCH.

Based on information on bundling CORESETs predetermined or indicated by the base station, the UE may attempt to recover and detect a PUCCH by using a soft value between PDCCH candidates in the plurality of CORESETs corresponding to the specific PDCCH.

In a more specific example, in the assumption that the specific PDCCH is transmitted through PDCCU candidate #n in the first CORESET and PDCCH candidate #m in the second CORESET, the UE may decode the PDCCH candidate #n and the PDCCH candidate #m, individually. If the specific PDCCH is failed to be detected at the both (e.g., CRC failure), combining a soft value after decoding may be considered, and, in this course, a coded bit or symbol value regarding DCI may be corrected.

More specifically, the soft value may be a value obtained after channel estimation and decoding. After the soft value is combined, a value of a specific coded bit or symbol may vary, and then PDCCH detection may be attempted again by performing CRC check after hard decision. Through the aforementioned post-process, PDCCH detection reliability may be increased. An advantage of this method is that the post-process has a complexity significantly lower compared to a decoding process and the number of times to perform blind decoding is not increased by bundling a plurality of CORESETs.

<PDSCH/PUSCH Transmission Method>

In a situation where a single PDCCH is mapped and transmitted through a plurality of CORESETs, each configuration CORESET may have a different CORESET duration (that is, the number of symbols included in a CORESET).

In a future wireless communication system, a PDSCH or PUSCH start slot and/or information regarding the start symbol may be dynamically indicated by corresponding scheduling DCI. If the PDSCH or PUSCH start slot is set with reference to a slot boundary, the start point may be set without ambiguity even when respective CORESET durations forming a PDCCH are different.

On the contrary, when the PDSCH or PUSCH start point is linked to a CORESET duration (e.g., an indication of a sequence number of a symbol in which a PDSCH or PUSCH is transmitted after a CORESET), a reference from among a plurality of configuration CORESETs may be needed. That is, when it is assumed that a PDSCH or PUSCH start point is indicated (through a higher layer signal and/or DCI), a reference point in time may be duration or an end time of a specific CORESET.

More specifically, the specific CORESET may be a CORESET having the smallest index value and/or a CORESET having the smallest carrier index and/or a CORESET having the smallest TRP index number. More specifically, a timing for a PDSCH may be set from an end time of a specific CORESET, and a start symbol index for a PUSCH may be indicated with reference to a slot boundary.

According to the present disclosure, it is possible to efficiently allocate a resource regarding DCI or a PDCCH in an application which requires high reliability.

Figure 11:
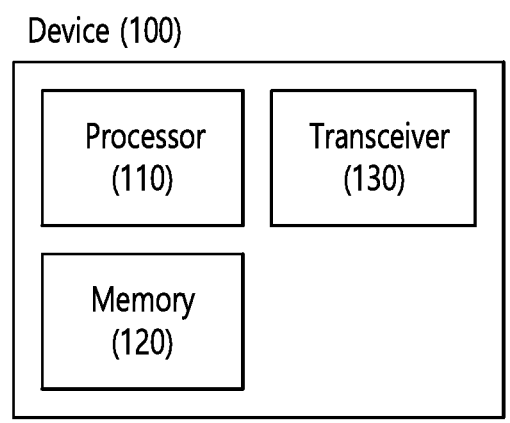
FIG. 11 is a block diagram illustrating a device implementing an embodiment of the present disclosure.

FIG. 11 is a block diagram illustrating a device implementing an embodiment of the present disclosure.

Referring to FIG. 11, the device 100 includes a processor 110, a memory 120, and a transceiver 130. The processor 110 implements the proposed functions, processes and/or methods. The memory 120 is connected to the processor 110 and stores various types of information for driving the processor 110. The transceiver 130 is connected to the processor 110 and transmits and/or receives a wireless signal.

The device 100 may be a base station (BS) or a terminal (or a user equipment (UE)).

The processor 110 may include application-specific integrated circuits (ASICs), other chipsets, logic circuits, data processors and/or a converter mutually converting a baseband signal and a wireless signal. The memory 120 may include read-only memory (ROM), random access memory (RAM), a flash memory, memory cards, storage mediums and/or other storage devices. The transceiver 130 may include at least one antenna for transmitting and/or receiving a wireless signal. When an embodiment is implemented by software, the above-described scheme may be implemented using a module (process or function) which performs the above function. The module may be stored in the memory 120 and executed by the processor 110. The memory 120 may be disposed within or outside the processor 110 and connected to the processor using a variety of well-known means.

What is claimed is:

1. A physical downlink control channel (PDCCH) reception method performed by a user equipment (UE) in a wireless communication system, the method comprising:
receiving, from a base station, allocation information for allocating a plurality of control resource sets (CORESETs), wherein the plurality of CORESETs are resources limited to some bandwidth parts in a system bandwidth of the base station in a frequency domain; and
receiving a single PDCCH through the plurality of CORESETs indicated by the allocation information,
wherein the single PDCCH is mapped through the plurality of CORESETs,
wherein each of the plurality of CORESETs comprises a plurality of control channel elements (CCEs), and
wherein a number of PDCCH candidates to which a PDCCH is allowed to be mapped is identical for each specific aggregation level of CCEs in each of the plurality of CORESETs.

2. The method of claim 1, wherein the plurality of CORESETs are positioned in a plurality of carriers.

3. The method of claim 1, wherein the plurality of CCEs in each of the plurality of CORESETs is aggregated in a predetermined number.

4. The method of claim 3, wherein a set of candidate values for the predetermined number of aggregated CCEs in each of the plurality of CORESETs is identical to each other.

5. The method of claim 1, wherein the single PDCCH is received from the plurality of CORESETs through PDCCH candidates having an identical index.

6. The method of claim 1, wherein downlink control information (DCI) is received through the single PDCCH.

7. The method of claim 6, wherein the DCI is encoded based on an amount of all resources in the plurality of CORESETs.

8. The method of claim 6, wherein the DCI is encoded based on an amount of resources in each of the plurality of CORESETs.

9. A user equipment (UE), comprising:
a transceiver configured to transmit and receive a radio signal; and
a processor configured to operate in connection with the transceiver, wherein the processor is further configured to:
receive, from a base station, allocation information for allocating a plurality of control resource sets (CORESETs), wherein the plurality of CORESETs are resources limited to some bandwidth parts in a system bandwidth of the base station in a frequency domain, and
receive a single physical downlink control channel (PDCCH) through the plurality of CORESETs indicated by the allocation information,
wherein the single PDCCH is mapped through the plurality of CORESETs,
wherein each of the plurality of CORESETs comprises a plurality of control channel elements (CCEs), and
wherein a number of PDCCH candidates to which a PDCCH is allowed to be mapped is identical for each specific aggregation level of CCEs in each of the plurality of CORESETs.

\* \* \* \* \*